3,598,807
PYRAZOLE COMPOUNDS AND PROCESS FOR PREPARING THE SAME

Kiyoshi Nakayama, Sagamihara-shi, and Haruo Tanaka, Machida-shi, Japan, assignors to Kyowa Hakko Kogyo, Ltd., Tokyo, Japan
Filed Aug. 5, 1969, Ser. No. 847,697
Claims priority, application Japan, Aug. 5, 1968, 43/54,945
Int. Cl. C07d 51/50
U.S. Cl. 260—211.5R    8 Claims

ABSTRACT OF THE DISCLOSURE

3(5)-amino-4-pyrazole-carboxamide, the 1 - β-D-ribofuranoside thereof and the 1-β-D-ribofuranoside-5'-phosphoric acid ester thereof are prepared by heating the corresponding 4-oxy-1H-pyrazolo(3,4-d)-pyrimidine and its derivatives at a temperature of up to 180° C., preferably 100°–140° C., in an aqueous solution having an alkaline pH, preferably 9.0–13.0. The products display anti-bacterial activity and are useful for the study of nucleic acid metabolism.

---

This invention relates to pyrazole compounds. More particularly, it relates to pyrazole compounds and to a process for producing the same by cleaving a pyrazolopyrimidine ring from certain pyrazolopyrimidine derivatives.

Specifically, the pyrazole compounds produced in accordance with the present invention have the structure shown in Formula II hereinbelow and include 3(5)-amino-4-pyrazole carboxamide (IIa), the 1-β-D-ribofuranoside thereof (IIb), or the 1-β-D-ribofuranoside-5'-phosphoric acid ester thereof (IIc). These compounds are prepared by cleaving or breaking a pyrazolopyrimidine ring from the compounds represented by Formula I, specifically 4-oxy-1-H-pyrazolo (3,4-d)pyrimidine (Ia), the 1-β-D-ribofuranoside thereof (Ib), or the 1-β-D-ribofuranoside-5'-phosphoric acid ester thereof (Ic), respectively.

(Formula I)

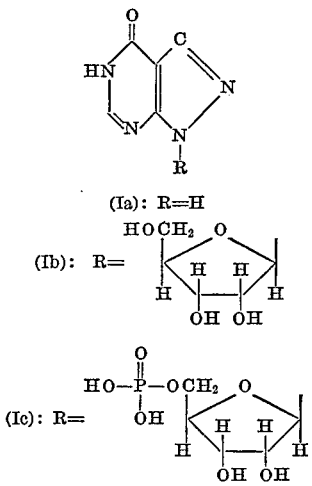

(Ia): R=H (Ib): R=

(Ic): R=

(Formula II)

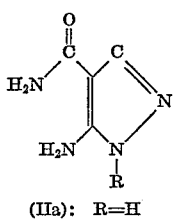

(IIa): R=H (IIb): R= 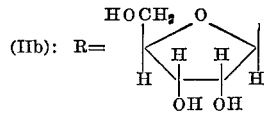

(IIc): R= 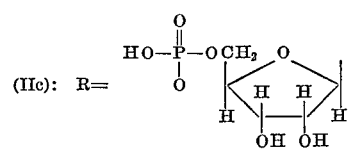

The compounds of Formula II are structural analogs of 5-amino-4-imidazole carboxamide (hereinafter referred to as AICA, AICA-riboside and AICA-ribotide). These compounds are intermediates or compounds related thereto in connection with the biosynthesis of purine and are not only reagents which are useful for the study of nucleic acid metabolism, but also are compounds which display an anti-microorganism activity. Furthermore, they are useful, for example, in procedures for the synthesis of other pyrazoles.

Accordingly, one of the objects of the present invention is to provide novel and useful pyrazole compounds.

Another object of the present invention is to provide a process for producing pyrazole compounds which may be carried out in an efficacious and relatively simple manner.

A further object of the invention is to provide a process for producing certain pyrazole compounds by means of a procedure in which a relatively high yield of product may be obtained.

These and other objects and advantages of the present invention will become apparent to those skilled in the art from a consideration of the following specification and claims and of the attached drawings wherein:

In accordance with the present invention, it has been found that the compounds of Formula II are produced in a remarkably good yield by heating the compounds of Formula I at a temperature not exceeding 180° C. in an aqueous solvent under alkaline conditions. In this manner, the desired ring cleavage is effected, and compounds (IIa), (IIb) or (IIc) are obtained, depending upon the starting compound (Ia), (Ib) or (Ic), respectively.

Figure 1:
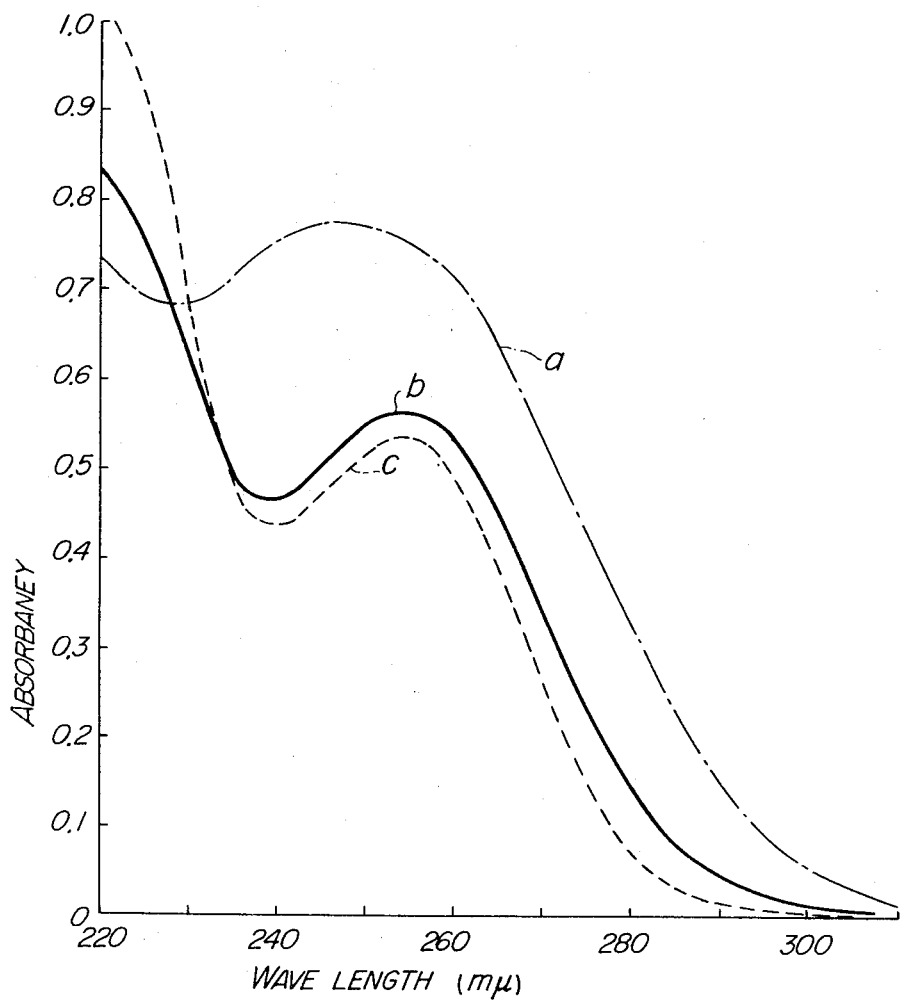
FIG. 1 is an ultraviolet absorption spectrum of 3(5)-amino-4-pyrazole-carboxamide.
Figure 2:
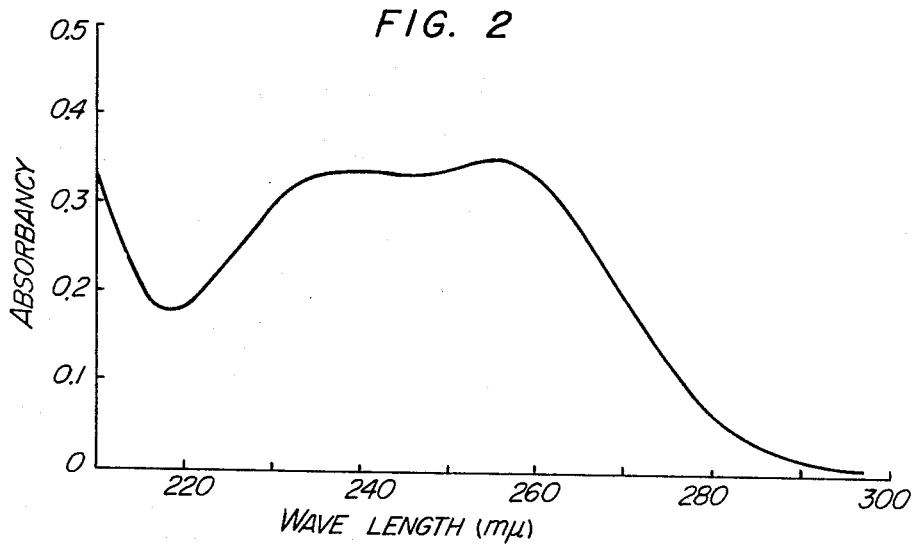
FIG. 2 is an ultraviolet absorption spectrum of 3(5)-amino-4-pyrazole-carboxamide-1-β-D-ribofuranoside.
Figure 3:
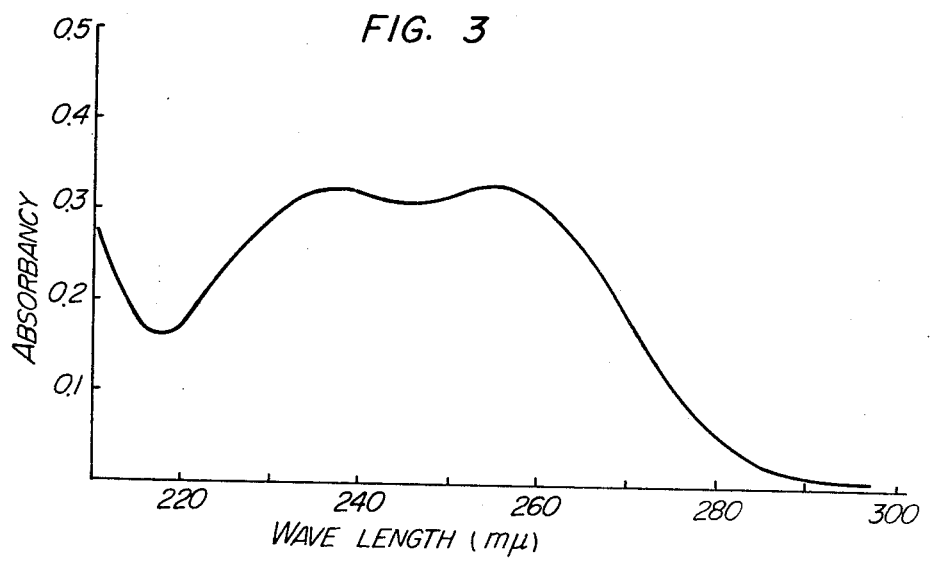
FIG. 3 is an ultraviolet absorption spectrum of 3(5)-amino - 4-pyrazole-carboxamide-1-β-D-ribofuranoside-5'-phosphoric acid ester.

The pyrazole compounds, IIa, IIb and IIc, obtained according to the present invention have, respectively, the ultraviolet absorption spectra shown in FIG. 1, FIG. 2 and FIG. 3. In FIG. 1, $a$ (—·—) is the alkaline curve, $b$ (—) the neutral curve and $c$ (---) the acid curve, respectively. The maximum absorptions of these compounds are as follows: IIa: 254 m$\mu$ (pH 1.5, aqueous solution), 255 m$\mu$ (pH 5.5, aqueous solution), 246 m$\mu$ (pH 12.0, aqueous solution); IIb: 237 m$\mu$ and 255 m$\mu$ (pH 5.5, aqueous solution); IIc: 237 m$\mu$ and 255 m$\mu$ (pH 5.5, aqueous solution). The $R_f$ values obtained by paper chromatography according to the ascending method at 28° C., using Toyo Filter Paper No. 51A, are as follows:

IIa, $R_f$ 0.75 (using a solvent comprising isobutyric acid: acetic acid: 1 N—NH$_4$OH=10:1:5 volume ratio); IIb, $R_f$ 0.67 (using a solvent comprising isopropanol: concentrated hydrochloric acid: water=170:41:39 volume ratio); IIc, $R_f$ 0.70 (using a solvent comprising isopropanol: concentrated hydrochloric acid: water=170:41:39 volume ratio).

In the method of the present invention, pyrazolopyrimidine compounds of the Formula I are heated in an aqueous solvent under a condition of alkalinity. The heating is carried out at a temperature in the range of from about 70° C. to 180° C., however, heating at reflux or heating at a temperature not exceeding 180° C. under pressure is generally employed.

As the pyrazolopyrimidine compounds of the Formula I to be used as starting material, any form of the free compound or a simple salt thereof such as sulphuric acid addition salt and sodium salt may be used. In order to obtain the desired alkaline aqueous solution, inorganic bases, for example, NaOH, KOH, $NH_4OH$, $Ca(OH)_2$ and the like, are advantageously used from the viewpoints of cost and aftertreatment. However, an organic base such as benzylamine, ethanolamine and the like may also be used. The pH of the aqueous solution may be alkaline at the beginning of the reaction, as shown in the experimental examples. Even if the initial pH is slightly acid, the compounds of the Formula II can still be produced if the pH is changed to the alkaline side during the reaction. However, the pH should be suitably selected so that the reaction will proceed in a good yield, taking the heating temperature into consideration. It can be seen from the following experimental examples that a range of pH of about 9.0 to 13.0 generally gives a good yield of the objective products.

EXPERIMENTAL EXAMPLE 1

The results obtained when aqueous solutions of Compound (Ia) containing 5 mg./ml. of the compound), the pH of which was regulated to the indicated values with NaOH, were heated for 3 hours at 100° C. or a sealed tube, at 140° C. are shown in Table 1. The pH of the solutions varied during the reaction, and the yield of product in the case of pH 13.2 was lower than in the case of pH 10.34 at 140° C.

TABLE I

| Heating temperature | Initial pH | pH after reaction | Ia[1] | IIa[1] |
|---|---|---|---|---|
| 100° C. | 6.30 | 6.10 | 0.134 | 0 |
| | 9.90 | 9.70 | 0.346 | 0.085 |
| | 10.34 | 10.15 | 0.843 | 0.173 |
| | 12.50 | 12.33 | 0.865 | 0.410 |
| | 13.20 | 13.10 | 0.667 | 0.430 |
| 140° C. | 6.30 | 9.25 | 0.235 | 0.362 |
| | 9.90 | 9.10 | 0.380 | 0.573 |
| | 10.34 | 11.00 | 0.093 | 0.890 |
| | 12.50 | 12.30 | 0 | 0.830 |
| | 13.20 | 13.02 | 0 | 0.650 |

[1] These figures represent the values obtained by measuring the absorption at 250 mμ after 20 μl. of reaction solution was spotted on Toyo Filter Paper No. 51A and subjected to paper chromatography with a solvent of isobutyric acid:acetic acid: 1 N–$NH_4OH$ (10:1:5 ratio by volume), from which spots of individual compounds (Ia, $R_f$ 0.65: IIa $R_f$ 0.75) were cut off and extracted with 4 ml. of water.

EXPERIMENTAL EXAMPLE 2

The results obtained when aqueous solutions of Compound (Ib) (having a concentration of 13.65 mM.), the pH of which was regulated to the indicated values with NaOH, were heated for 3 hours at 100° C. or, in a sealed tube, at 140° C. are shown in Table 2.

TABLE 2

| Heating temperature | Initial pH | pH after reaction | Ib[1] | IIb[1] |
|---|---|---|---|---|
| 100° C. | 4.51 | 4.80 | 0.520 | 0 |
| | 7.14 | 7.14 | 0.520 | 0 |
| | 9.70 | 9.43 | 0.490 | 0.03 |
| | 12.50 | 12.33 | 0.485 | 0.037 |
| | 13.20 | 13.10 | 0.480 | 0.047 |
| 140° C. | 4.51 | 7.80 | 0.395 | 0.123 |
| | 7.14 | 9.30 | 0.260 | 0.220 |
| | 9.70 | 11.21 | 0.160 | 0.380 |
| | 12.50 | 12.45 | 0.155 | 0.290 |
| | 13.20 | 13.00 | 0.199 | 0.175 |

[1] These figures represent the values obtained by measuring the absorption at 252 mμ for Ib and at 255 mμ for IIb after 20 μl. of reaction solution was spotted on Toyo Filter Paper No. 51 and subjected to paper chromatography with a solvent of isopropanol: concentrated hydrochloric acid: water (170: 41:39 ratio by volume), from which spots of individual compounds ($R_f$ of Ib, 0.82: $R_f$ of IIb 0.67) were cut off and extracted with 4 ml. of water.

EXPERIMENTAL EXAMPLE 3

The results obtained when aqueous solutions of Compound Ic (at a concentration of 12.5 mM.), the pH of which was regulated to the indicated values with NaOH, were heated for 3 hours at 100° C. or, in a sealed tube, at 140° C. are shown in Table 3.

TABLE 3

| Heating temperature | Initial pH | pH after reaction | Ic[1] | IIc[1] |
|---|---|---|---|---|
| 100° C. | 4.36 | 4.52 | 0.493 | 0 |
| | 6.38 | 6.92 | 0.528 | 0 |
| | 10.70 | 9.91 | 0.470 | 0.023 |
| | 12.62 | 12.60 | 0.470 | 0.032 |
| | 13.20 | 13.12 | 0.500 | 0.047 |
| 140° C. | 4.36 | 9.98 | 0.255 | 0.215 |
| | 6.38 | 10.53 | 0.190 | 0.290 |
| | 10.70 | 11.90 | 0.160 | 0.330 |
| | 12.62 | 12.60 | 0.115 | 0.315 |
| | 13.20 | 13.10 | 0.148 | 0.210 |

[1] These figures represent the values obtained by measuring the absorption at 252 mμ for Ic and at 255 mμ for IIc after 20 μl. of reaction solution was spotted on Toyo Filter Paper No. 51A and subjected to paper chromatography with a solvent of isopropanol=: concentrated hydrochloric acid: water (170:41:39 ratio by volume), from which individual spots (Ic, $R_f$ 0.89; IIc, $R_f$ 0.70) were cut off and extracted with 4 ml. of water.

Accordingly, it can be seen that when an aqueous solution of pyrazolopyrimidine of Formula I is heated under alkaline pH conditions to the extent of reflux or at a temperature not exceeding 180° C., preferably 100° C. to 140° C., under pressure, the objective compounds of Formula II can be obtained in good yield in accordance with the present invention.

The following examples are given merely as illustrative of the present invention and are not to be considered as limiting. The produced pyrazole compounds of Formula II described in the examples are recovered by extraction with an ammoniacal alcohol solution after adsorption with charcoal powder and evaporation of the solvent, or by precipitation with the addition of an organic solvent miscible with water to the concentrated solution.

EXAMPLE 1

When an aqueous solution (pH 10.7, concentration 4.3 mg./ml.) of the monosodium salt of 4-oxy-1H-pyrazolo - (3,4 - d) - pyrimidine - 1 - β - D - ribofuranoside-5'-phosphoric acid ester, dissolved in 0.03 N NaOH, is heated for 4 hours at 140° C. in a sealed tube, 3(5)-amino - 4 - pyrazolecarboxamide - 1 - β - D - ribofuranoside-5'-phosphoric acid ester is produced in a concentration of 3.7 mg./ml. in the solution after the completion of the reaction. After 100 ml. of the thus-obtained reaction solution is adjusted to pH 2.0 with HCl, 5 g. of charcoal powder is added thereto in order to adsorb the resultant product. The charcoal powder is extracted with 50 ml. of 50% ethanol containing 2% $NH_4OH$, and the extracting solution is concentrated and exsiccated under reduced pressure, whereby 260 mg. of 3(5)-amino-4-pyrazole - carboxamide - 1 - β - D - ribofuranoside - 5'-pyrophosphoric acid ester is obtained. Elementary analysis of said compound gives the following results: C, 30.9%; H, 4.50%; N, 16.1%.

EXAMPLE 2

When an aqueous solution having a pH of 9.70 and containing 4 - oxy - 1H - pyrazolo(3,4 - d) - pyrimidine - 1-β - D - ribofuranoside in a concentration of 3.6 mg./ml. is heated for 4 hours at 140° C. in a sealed tube, 3(5)-amino - 4 - pyrazole - carboxamide - 1 - β - D - dibofuranoside is produced in a concentration of 3.0 mg./ml. in the reaction solution. After the pH of the thus-obtained reaction solution (100 ml.) is adjusted to 2.0 with HCl, 5 g. of charcoal powder is added to adsorb the resultant product. The charcoal powder is extracted with 50 ml. of 50% ethanol containing 2% $NH_4OH$, and the extracting solution is concentrated and exsiccated under reduced pressure, whereby 200 mg. of 3(5) - amino - 4 - pyrazole-carboxamide - 1 - β - D - ribofuranoside is obtained.

Elementary analysis of said compound give the following results: C, 41.5%; H, 5.32%; N, 21.0%.

EXAMPLE 3

When an aqueous solution containing 4-oxy-1H-pyrazolo(3,4-d)-pyrimidine in a concentration of 5 mg./ml. and having a pH of 12.50 (adjusted with NaOH) is heated for 4 hours at 140° C. in a sealed tube, 3(5)-amino-4-pyrazole-carboxamide is produced in a concentration of 4.0 mg./ml. in the reaction solution. Then, the pH of 100 ml. of the thus-obtained reaction solution is adjusted to 2.0 with HCl and 5 g. of charcoal powder is added thereto to adsorb the resultant product. Thereafter, the charcoal powder is extracted with 50 ml. of 50% ethanol containing 2% $NH_4OH$, and the extracting solution is concentrated and exsiccated under reduced pressure, whereby 300 mg. of 3(5)-amino-4-pyrazole-carboxamide is obtained. The elementary analysis values of said compound are as follows: C, 38.2%; H, 4.71%; N, 44.0%.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. 3(5)-amino-4-pyrazole-carboxamide-1 - β - D - ribofuranoside.

2. 3(5)-amino-4-pyrazole-carboxamide-1-β - D - ribofuranoside-5'-phosphoric acid ester.

3. A process for the preparation of 3(5)-amino-4-pyrazole-carboxamide, the 1-β-D-ribofuranoside thereof or the 1-β-D-ribofuranoside-5'-phosphoric acid ester thereof which consists essentially of heating the corresponding starting material 4-oxy-1H-pyrazolo(3,4-d)-pyrimidine, the 1-β-D-ribofuranoside thereof or the 1-β-D-ribofuranoside-5'-phosphoric acid ester thereof, or a simple inorganic salt thereof, under pressure at a temperature of about 70° to 180° C. in water at a pH of about 9.0 to 13.0, and recovering the reaction product from the resultant reaction mixture.

4. The process of claim 3, wherein the temperature of heating is about 100° to 140° C.

5. The process of claim 3, wherein the heating step is carried out at the reflux temperature of the reaction mixture.

6. A process for the preparation of 3(5) - amino-4-pyrazole-carboxamide which consists essentially of heating 4-oxy-1H-pyrazolo(3,4-d)-pyrimidine under pressure at a temperature of about 70° to 180° C. in water at a pH of about 9.0 to 13.0, and recovering said 3(5)-amino-4-pyrazole-carboxamide from the resultant reaction mixture.

7. A process for the preparation of 3(5) - amino - 4-pyrazole-carboxamide-1-β-D-ribofuranoside which consists essentially of heating 4-oxy-1H - pyrazole(3,4 - d)-pyrimidine-1-β-D-ribofuranoside under pressure at a temperature of about 70° to 180° C. in water at a pH of about 9.0 to 13.0, and recovering said 3(5)-amino-4-pyrazole-carboxamide-1-β-D-ribofuranoside from the resultant reaction mixture.

8. A process for the preparation of 3(5) - amino - 4-pyrazole-carboxamide-1-β - D - ribofuranoside - 5' - phosphoric acid ester which consists essentially of heating 4-oxy-1H-pyrazolo(3,4-d)-pyrimidine-1-β - D - ribofuranoside-5'-phosphoric acid ester under pressure at a temperature of about 70° to 180° C. in water at a pH of about 9.0 to 13.0, and recovering said 3(5)-amino-4-pyrazole-carboxamide-1-β-D-ribofuranoside - 5' - phosphoric acid ester from the resultant reaction mixture.

References Cited

UNITED STATES PATENTS 3,364,199   1/1968   Yamazaki et al. ____ 260—211.5

LEWIS GOTTS, Primary Examiner

J. R. BROWN, Assistant Examiner

U.S. Cl. X.R.

260—310R, 999

UNITED STATES PATENT OFFICE
CERTIFICATE OF CORRECTION

Patent No. 3,598,807          Dated  August 10, 1971

Inventor(s) Kiyoshi Nakayama and Haruo Tanaka

It is certified that error appears in the above-identified patent and that said Letters Patent are hereby corrected as shown below:

Column 1, line 5, after "Kogyo" delete the ",".

Column 1, line 6, before "Ltd.," insert -- Co., --.

Signed and sealed this 7th day of March 1972.

(SEAL)
Attest:

EDWARD M. FLETCHER, JR.          ROBERT GOTTSCHALK
Attesting Officer                Commissioner of Patents